(12) United States Patent
Gole (10) Patent No.: US 7,437,423 B1
(45) Date of Patent: Oct. 14, 2008

(54) SYSTEM AND METHOD FOR MONITORING CLUSTER PARTNER BOOT STATUS OVER A CLUSTER INTERCONNECT

(75) Inventor: Abhijeet Gole, Campbell, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 0 days.

(21) Appl. No.: 11/650,005

(22) Filed: Jan. 5, 2007

Related U.S. Application Data (63) Continuation of application No. 10/284,795, filed on Oct. 31, 2002, now Pat. No. 7,171,452.

(51) Int. Cl.
 *G06F 15/167* (2006.01)
(52) U.S. Cl. ............... 709/212; 709/222; 713/2; 714/2; 714/48
(58) Field of Classification Search ......... 709/212–216, 709/220–222; 713/1–2; 714/2, 4, 47–48
 See application file for complete search history.

(56) References Cited

U.S. PATENT DOCUMENTS

| | | | |
|---|---|---|---|
| 4,937,763 A | 6/1990 | Mott | |
| 5,067,099 A | 11/1991 | McCown et al. | |
| 5,157,663 A | 10/1992 | Major et al. | |
| 5,163,131 A | 11/1992 | Row et al. | |
| 5,355,453 A | 10/1994 | Row et al. | |
| 5,485,579 A | 1/1996 | Hitz et al. | |
| 5,633,999 A | 5/1997 | Clowes et al. | |
| 5,680,580 A | 10/1997 | Beardsley et al. | |
| 5,781,770 A | 7/1998 | Byers et al. | |
| 5,802,366 A | 9/1998 | Row et al. | |
| 5,812,748 A | 9/1998 | Ohran et al. | |
| 5,812,751 A | 9/1998 | Ekrot et al. | |
| 5,819,292 A | 10/1998 | Hitz et al. | |
| 5,931,918 A | 8/1999 | Row et al. | |
| 5,941,972 A | 8/1999 | Hoese et al. | |

(Continued)

FOREIGN PATENT DOCUMENTS

WO     WO-01/35244 A1     5/2007

OTHER PUBLICATIONS

NCI TS 332-1999 fibre Channel Arbitrated Loop (FC-AL-2) published by the American National Standards Institute.

(Continued)

*Primary Examiner*—Bharat N Barot
(74) *Attorney, Agent, or Firm*—Cesari and McKenna, LLP

(57) ABSTRACT

A method for detecting an un-bootable first computer is described. A failed first computer initiates a boot procedure, and the boot procedure is controlled by boot firmware of the first computer. A virtual interface is established by the boot firmware, the virtual interface having boot status data written therein as the failed computer boots. A second computer reads the boot status data in the virtual interface using a remote direct memory access procedure to access data in the virtual interface. The second computer determines, in response to the boot status data, if the boot procedure of the first computer failed, and if it failed performing a failover routine; and if it succeeded allowing the failed computer to complete its boot procedure. Another connection between the first computer and the second computer is opened, in response to the boot procedure succeeding, using higher level software than the boot firmware.

17 Claims, 5 Drawing Sheets

U.S. PATENT DOCUMENTS

| | | | |
|---|---|---|---|
| 5,948,110 | A | 9/1999 | Hitz et al. |
| 5,950,225 | A | 9/1999 | Kleiman et al. |
| 5,951,695 | A | 9/1999 | Kolovson |
| 5,963,962 | A | 10/1999 | Hitz et al. |
| 6,038,570 | A | 3/2000 | Hitz et al. |
| 6,065,037 | A | 5/2000 | Hitz et al. |
| 6,119,244 | A | 9/2000 | Schoenthal et al. |
| 6,138,126 | A | 10/2000 | Hitz et al. |
| 6,230,285 | B1 * | 5/2001 | Sadowsky et al. ............ 714/14 |
| 6,289,356 | B1 | 9/2001 | Hitz et al. |
| 6,292,905 | B1 | 9/2001 | Wallach et al. |
| 6,381,694 | B1 * | 4/2002 | Yen ............................... 713/2 |
| 6,425,035 | B2 | 7/2002 | Hoese et al. |
| 6,430,687 | B1 * | 8/2002 | Aguilar et al. ................. 713/2 |
| 6,625,749 | B1 | 9/2003 | Quach |
| 6,728,897 | B1 | 4/2004 | Cramer et al. |
| 6,754,855 | B1 * | 6/2004 | Denninghoff et al. ......... 714/48 |
| 6,760,304 | B2 | 7/2004 | Uzrad-Nali et al. |
| 6,920,579 | B1 | 7/2005 | Cramer et al. |
| 6,973,587 | B1 * | 12/2005 | Maity et al. .................... 713/2 |
| 7,143,176 | B2 | 11/2006 | Gluck et al. |
| 7,184,445 | B2 | 2/2007 | Gupta et al. |
| 7,231,045 | B1 | 5/2007 | Uzrad-Nali et al. |
| 7,281,031 | B1 * | 10/2007 | Wang et al. .................. 709/213 |
| 2003/0028628 | A1 * | 2/2003 | Irwin et al. .................. 709/222 |
| 2003/0115350 | A1 | 6/2003 | Uzrad-Nali et al. |
| 2004/0010545 | A1 | 1/2004 | Pandya |
| 2004/0030668 | A1 | 2/2004 | Pawlowski et al. |
| 2004/0268017 | A1 | 12/2004 | Uzrad-Nail et al. |

OTHER PUBLICATIONS

Virtual Interface Architecture Specification, Version 1.0, published by a collaboration between Compaq Computer Corp., Intel Corp. and Microsoft Corp.

David Hitz et al. TR3002 File System Design for a NFS File Server Appliance published by Network Appliance, Inc.

Fielding et al. (1999) Request for Comments (RFC) 2616, HTTP/1.1.

Common Internet File System (CIFS) Version: CIFS-Spec 0.9, Storage Networking Industry Association (SNIA), Draft SNIA CIFS Documentation Work Group Work-In-Progress, Revision Date Mar. 26, 2001.

European Search Report for Application No. EP 01 01 6755, Nov. 08, 2004 pp. 1-3.

* cited by examiner

SYSTEM AND METHOD FOR MONITORING CLUSTER PARTNER BOOT STATUS OVER A CLUSTER INTERCONNECT

RELATED APPLICATIONS

The present application is a continuation of U.S. patent application Ser. No. 10/284,795, which was filed on Oct. 31, 2002 now U.S. Pat. No. 7,171,452, by Abhijeet Gole, for SYSTEM AND METHOD FOR MONITORING CLUSTER PARTNER BOOT STATUS OVER A CLUSTER INTERCONNECT, the teachings of which are hereby incorporated by reference.

FIELD OF THE INVENTION

The present invention relates to storage systems having a cluster of interconnected file servers and, in particular, to monitoring the boot status of a cluster partner.

BACKGROUND OF THE INVENTION

A storage system is a computer that provides storage service relating to the organization of information on writeable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of directories and files on, e.g. the disks. Each "on-disk" file may be implemented as a set of data structures, e.g., disk blocks, configured to store information, such as the actual data for the file. A directory, on the other hand, may be implemented as a specially formatted file in which information about other files and directories are stored.

It is advantageous for the services and data provided by a storage system, such as a filer or storage appliance, to be available for access to the greatest degree possible. Accordingly, some computer storage arrangements provide a plurality of storage systems in a cluster, with a property that when a first storage systems fails, the second storage system is available to take over and provide the services and the data otherwise provided by the first storage system. When a first storage system fails, the second storage system in a cluster assumes the task of processing and handling any data access requests normally processed by the first storage system. One such example of a cluster configuration is described generally in U.S. patent application Ser. No. 09/933,866 entitled OPERATOR INITIATED GRACEFUL TAKEOVER IN A NODE CLUSTER by, Samuel M. Cramer et al., now issued as U.S. Pat. No. 6,920,579 on Jul. 19, 2005, the contents of which are hereby incorporated by reference.

In the event of the failure of a storage system, the partner storage system may initiate a failover routine. This failover routine includes, inter alia, the assumption of data servicing operations directed to the disks formerly managed by the failed storage system. However, in certain situations, a storage system may suffer a temporary error condition that is easily remedied by a reboot or reinitialization quickly with little corresponding downtime. Given such a temporary error condition (and reboot), it may not be advantageous for the surviving storage system to initiate a failover routine. For example, if the failover routine would require a longer period of time to execute than for the failed storage system to correct the error condition, it would then be more advantageous to allow the failed storage system to perform the corrective reboot and resume processing data access requests directed to the disks.

However, a noted disadvantage of prior clustered failover implementations is that the failed storage system is not designed to transmit its boot status (e.g., its progress in performing a booting or initialization routine) to a cluster partner or otherwise broadcast this information over a network. As a cluster partner would typically require to know if its failed partner is successfully booting to decide whether or not to initiate a failover procedure, the surviving storage system must simply "wait and see." However, under a wait and see approach, data access operations may be lost while the surviving storage system waits to determine if the failed storage system is booting properly, especially where the failed storage system is not booting properly.

Thus, a noted disadvantage of the prior art is the lack of a reliable mechanism for communicating the boot status of a failed storage system to its cluster partner while the failed storage system is booting. Without this effective communication mechanism, the surviving storage system must either perform a potentially unnecessary failover procedure or wait to determine if the booting storage system completes its boot procedure successfully.

SUMMARY OF THE INVENTION

The disadvantages of the prior art are overcome by providing a system and method for monitoring a cluster partner boot status using a remote direct memory access (RDMA)-capable transport protocol, such as the virtual interface (VI) protocol. The pre-sent invention is, in an illustrative embodiment, implemented in the boot firmware of a storage system. Upon entering the firmware booting stage, a storage system creates two virtual interfaces (VI), each with preset and predetermined connection information. As the connection information is fixed, the booting storage system does not require the intervention of any higher-level VI software layers to be operational. Once the virtual interfaces have been opened, the surviving storage system may initiate a RDMA operation to retrieve various boot status data from the booting storage system. In this manner, the decision can be made expeditiously as to whether a takeover by the surviving system or corrective reboot by the failed system is more appropriate.

In accordance with the present invention, a surviving storage system of a cluster arrangement may access a booting storage system in the cluster pair via a predetermined and pre-assigned virtual interface. The present invention eliminates the need for the boot firmware of the booting storage system to actively broadcast its boot status to the surviving storage system. Under the VI protocol, a VI connection must be established before any RDMA operations may be performed over the virtual interface. However, this VI connection procedure requires the active negotiation between the two endpoints of the VI connection. The present invention removes the need for the booting storage system to actively negotiate the initial VI connection setup.

BRIEF DESCRIPTION OF THE DRAWINGS

The above and further advantages of invention may be understood by referring to the following description in conjunction with the accompanying drawings in which like reference numerals indicate identical or functionally similar elements.

DETAILED DESCRIPTION OF ILLUSTRATIVE EMBODIMENTS

A. Cluster Environment

Figure 1:
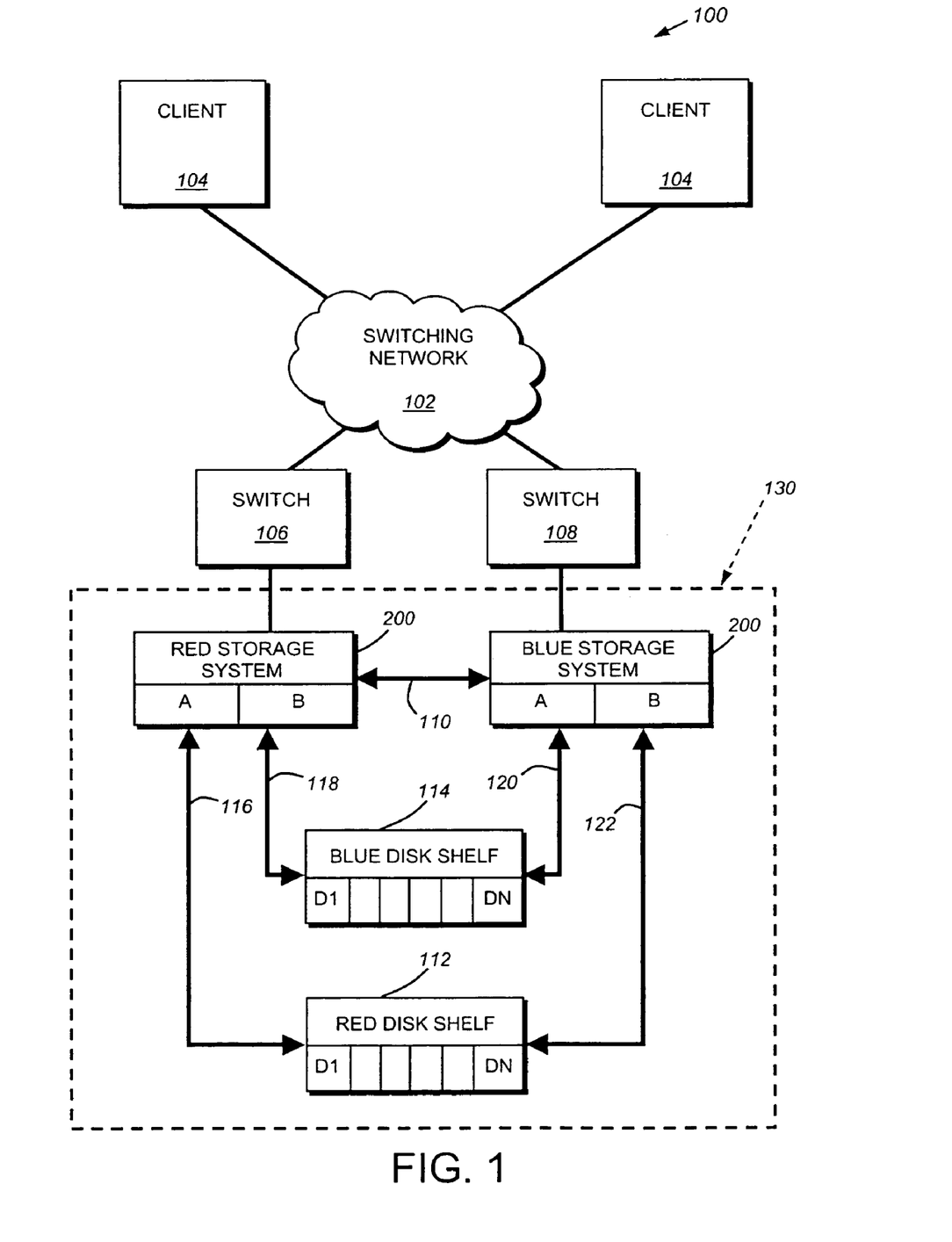
FIG. 1 is a schematic block diagram of an exemplary network environment showing an illustrative storage system cluster in accordance with an embodiment of the invention.

FIG. 1 is a schematic block diagram of an exemplary network environment 100 in which the principles of the present invention are implemented. The network 100 is based around a network 102 configured as, e.g., a Fibre Channel (FC) switching network. FC is a set of related protocol standards defining a transport service for a variety of data access protocols. The network 102 may also be embodied, in alternate embodiments, as other forms of networks including, for example, a TCP/IP based network. Attached to the network cloud are a number of switches, 106 and 108, which connect to FCP devices, designated, for example as Red storage system and Blue storage system (each denoted 200). A number of clients 104 are also interconnected with the network cloud.

A client 104 may be a general-purpose computer, such as a PC or a workstation, or a special-purpose computer, such as an application server, configured to execute applications over an operating system that includes block access protocols. Red storage system and Blue storage system 200 are connected as two nodes of a storage system cluster 130. These storage systems, described further below, are storage appliances configured to control storage of and access to, interconnected storage devices. Each of the devices attached to the switching network 102 includes an appropriate conventional network interface arrangement (not shown) for communicating over the switching network 102, or through the switches 106 and 108, using a set of desired file or block access protocols, such as Network File System (NFS) or iSCSI.

In the illustrated example, the Red storage system is connected to Red Disk Shelf 112 by data access loop 116. It should be noted that such a data access loop can be any acceptable networking media including, for example, a Fibre Channel Arbitrated Loop (FC-AL). Similarly, the Red storage system accesses Blue Disk Shelf 114 (with disks D1-DN) via counterpart data access loop 118. Likewise, Blue storage system accesses Blue Disk Shelf 114 (with disks D1-DN) via data access loop 120 and Red Disk Shelf 112 through counterpart data access loop 122. It should be noted that the Red and Blue disk shelves are shown directly connected to storage system 200 for illustrative purposes only. The disk shelves and storage systems may be operatively interconnected in any suitable switching network topology including, for example, via routers or switches. During normal cluster operation, the storage system that is connected to a disk shelf via the disk shelf's A loop is the "owner" of the disk shelf and is primarily responsible for servicing data requests directed to blocks on volumes contained on that disk shelf. Thus, in this example, the Red storage system would own the Red Disk Shelf 112 and be primarily responsible for servicing data access requests for blocks contained on that disk shelf. Similarly, the Blue storage system would be primarily responsible for the Blue disk shelf 114. When operating as a storage system cluster, each storage system is designed to take over and assume data handling capabilities for the other disk shelf in the cluster 130 in the event that one of the storage systems suffers an error condition.

Connecting the Red and Blue storage systems is a cluster interconnect 110, which provides a direct communication link between the two storage systems. The cluster interconnect can be of any suitable communication medium, including, for example a Fibre Channel connection. The cluster interconnect 110 is used, inter alia, for sending heartbeat signals to a cluster partner. These heartbeat signals alert a storage system's partner that a storage system is functioning.

B. Storage Appliance

Figure 2:
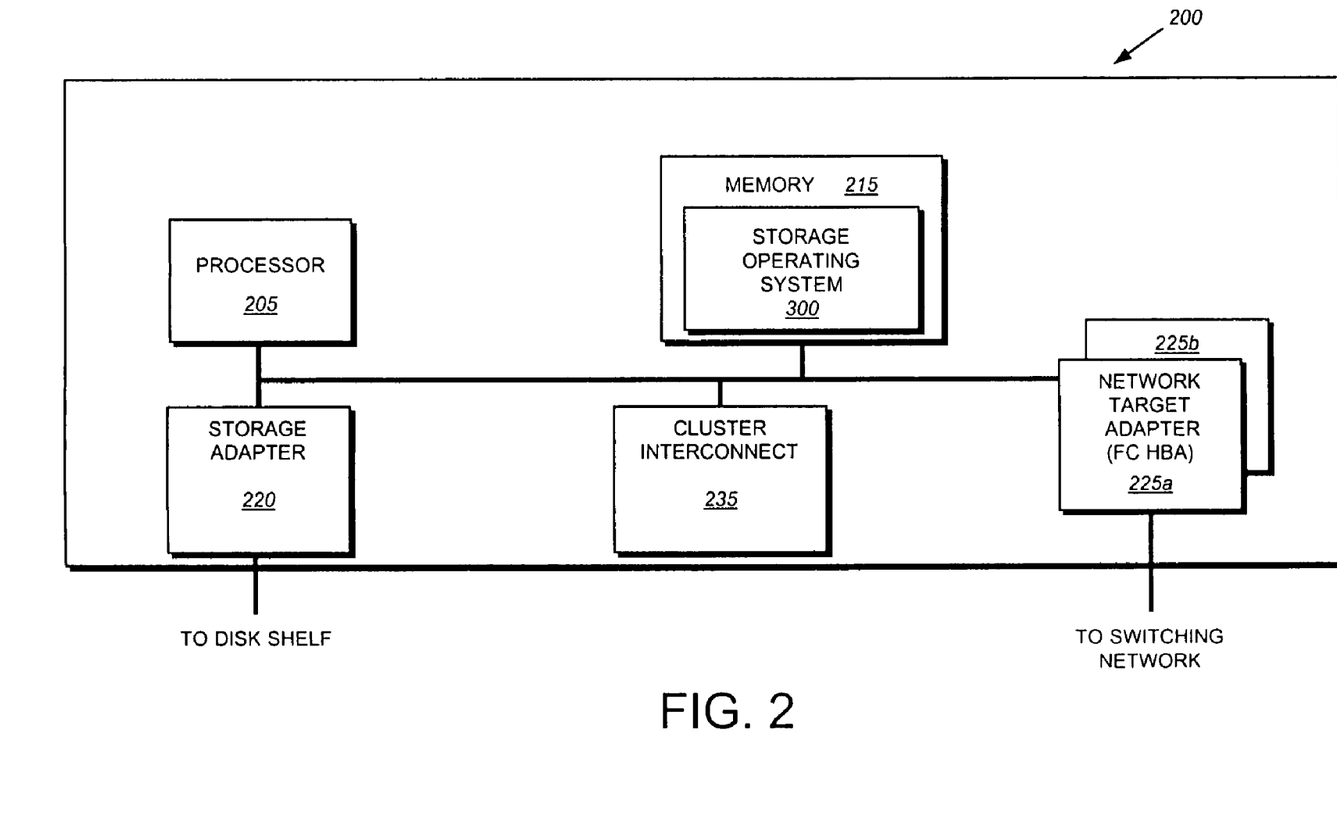
FIG. 2 is a schematic block diagram of an exemplary storage system in accordance with an embodiment of the present invention.

FIG. 2 is a schematic block diagram of an exemplary storage system 200 as used in cluster environment 100 configured to provide storage service relating to the organization of information on storage devices, such as disks. The storage system 200 is illustratively embodied as a multi-protocol storage appliance comprising a processor 205, a memory 215, a plurality of network adapters 225a, 225b and a storage adapter 220 interconnected by a system bus 230. A multi-protocol storage appliance is a computer having features such as simplicity of storage service management and ease of storage reconfiguration, including reusable storage space, for users (system administrators) and clients of network attached storage (NAS) and storage area networks (SAN) deployments. The storage appliance may provide NAS services through a file system, while the same appliance provides SAN services through SAN virtualization, including logical unit number (lun) emulation. Multi-protocol storage appliances are further described in U.S. patent application Ser. No. 10/215,917, entitled MULTI-PROTOCOL STORAGE APPLIANCE THAT PROVIDES INTEGRATED SUPPORT FOR FILE AND BLOCK ACCESS PROTOCOLS, by Brian Pawlowski, et al., now published as U.S. Published Application Serial No. US2004-0030668 A1 on Feb. 12, 2004, the teachings of which are hereby incorporated by reference. It should be noted, that a conventional file server may be utilized as a storage system in accordance with the teachings of the present invention. The terms "storage system", "storage appliance" and "file server" are thus used interchangeable. The storage appliance 200 also includes a storage operating system 300 that provides a virtualization function to logically organize the information as a hierarchical structure of directory, file and virtual disk (vdisk) storage objects on the disks.

In the illustrative embodiment, the memory 215 comprises storage locations that are addressable by the processor and adapters for storing software program code and data structures associated with the present invention. The processor and adapters may, in turn, comprise processing elements and/or logic circuitry configured to execute the software code and manipulate the data structures. The storage operating system 300, portions of which are typically resident in memory and executed by the processing elements, functionally organizes the storage appliance by, inter alia, invoking storage operations in support of the storage service implemented by the appliance. It will be apparent to those skilled in the art that other processing and memory means, including various computer readable media, may be used for storing and executing program instructions pertaining to the inventive system and method described herein.

The network adapters 225a and 225b couple the storage appliance to a plurality of clients over point-to-point links, wide area networks (WAN), virtual private networks (VPN) implemented over a public network (Internet) or a shared local area network (LAN) or any other acceptable networking architecture.

The network adapters 225 a, b also couple the storage appliance 200 to a plurality of clients 104 that may be further configured to access the stored information as blocks or disks. For this SAN-based network environment, the storage appliance is coupled to an illustrative Fibre Channel (FC) switching network 102. The network adapters 225 may comprise a Fibre Channel host bus adapter (HBA) having the mechanical, electrical and signaling circuitry needed to connect the storage appliance 200 to a SAN network switch, such as a conventional FC switch. In addition to providing FC access, the FC HBA may offload Fibre Channel network processing operations from the storage appliance's processor.

The clients may be general-purpose computers configured to execute applications over a variety of operating systems, including the UNIX® and Microsoft® Windows™ operating systems.

The storage adapter 220 cooperates with the storage operating system 300 executing on the storage appliance to access information requested by the clients. The information may be stored on the disks or other similar media adapted to store information. The storage adapter includes I/O interface circuitry that couples to the disks over an I/O interconnect arrangement, such as a conventional high-performance, FC serial link or loop topology. The information is retrieved by the storage adapter and, if necessary, processed by the processor 205 (or the adapter 220 itself) prior to being forwarded over the system bus 230 to the network adapters 225a and b, where the information is formatted into packets or messages and returned to the clients.

Storage of information on the multi-protocol storage appliance 200 is, in the illustrative embodiment, implemented as one or more storage volumes that comprise a cluster of physical storage disks, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails.

Specifically, each volume is constructed from an array of physical disks that are organized as RAID groups. The physical disks of each RAID group include those disks configured to store striped data and those configured to store parity for the data, in accordance with an illustrative RAID 4 level configuration. However, other RAID level configurations (e.g. RAID 5) are also contemplated. In the illustrative embodiment, a minimum of one parity disk and one data disk may be employed. Yet, a typical implementation may include three data and one parity disk per RAID group and at least one RAID group per volume.

The file system logically organizes the information as a hierarchical structure of directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored.

Also connected to the system bus 230 is a cluster interconnect device 235. The cluster interconnect device 235 operates within conjunction with the cluster interconnect 110 to monitor the status of a cluster pair or partner. Specifically, the cluster interconnect may, in alternate embodiments, issue periodic heartbeat signals to a cluster partner to alert the partner that a given storage system is functioning properly. The cluster interconnect 235 may be embodied using numerous networking methods, including, for example a Fibre Channel link.

C. Storage Operating System

In the illustrative embodiment, the storage operating system is the NetApp® Data ONTAP™ operating system available from Network Appliance, Inc., Sunnyvale, California that implements a Write Anywhere File Layout (WAFL™) file system. However, it is expressly contemplated that any appropriate storage operating system, including a write in-place file system, may be enhanced for use in accordance with the inventive principles described herein. As such, where the term "WAFL" is employed, it should be taken broadly to refer to any storage operating system that is otherwise adaptable to the teachings of this invention.

As used herein, the term "storage operating system" generally refers to the computer-executable code operable on a computer that manages data access and may, in the case of a filer or storage appliance, implement data access semantics, such as the Data ONTAP storage operating system, which is implemented as a microkernel. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive technique described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 3:
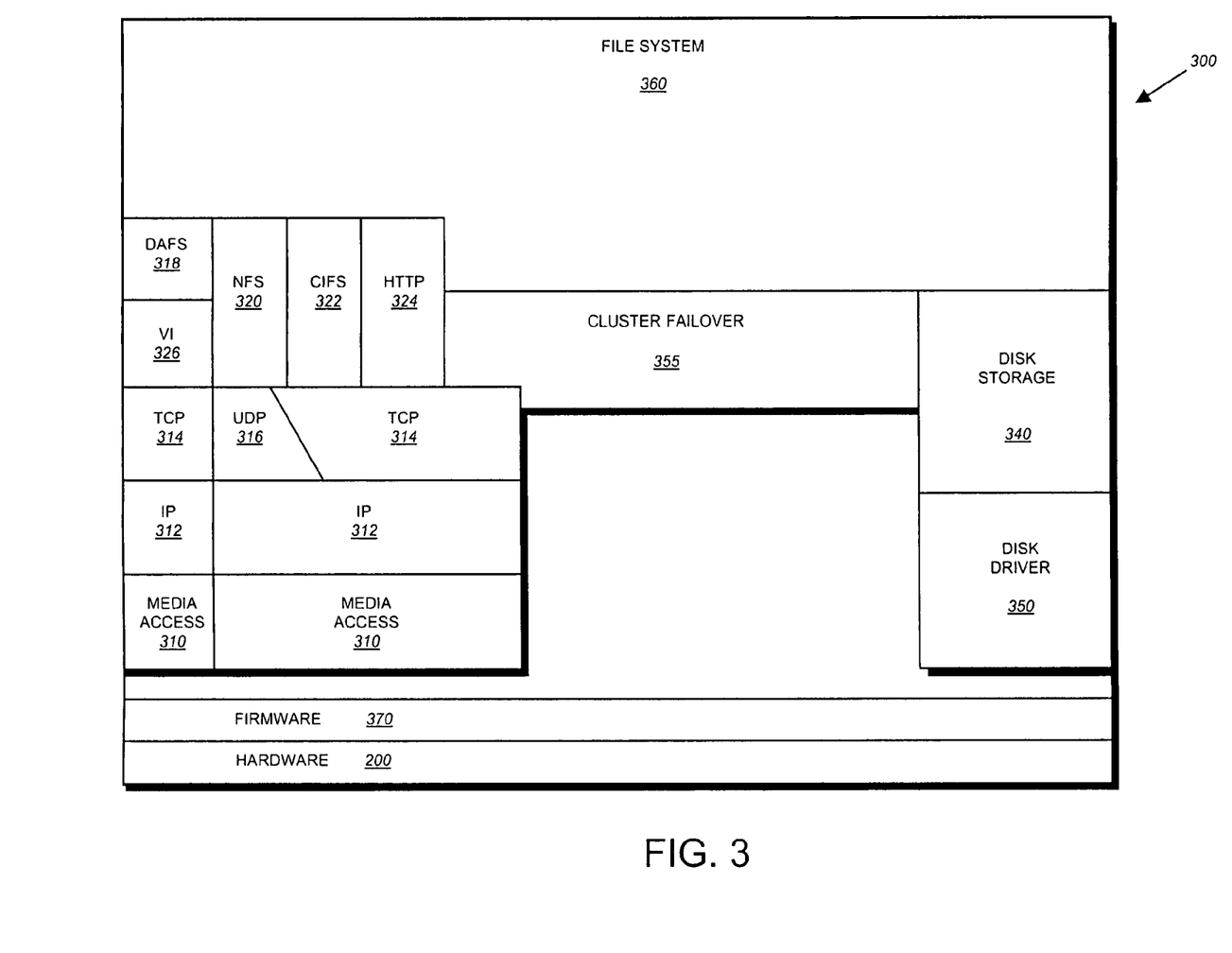
FIG. 3 is a schematic block diagram of an exemplary storage operating system for use on a storage system in accordance with an embodiment of the present invention.

FIG. 3 is a schematic block diagram of the storage operating system 300 that may be advantageously used with the present invention. The storage operating system comprises a series of software layers organized to form an integrated network protocol stack or multi-protocol engine that provides data paths for clients to access information stored on the multi-protocol storage appliance using block and file access protocols. The protocol stack includes a media access layer 310 of network drivers (e.g., gigabit Ethernet drivers) that interfaces to network protocol layers, such as the IP layer 312 and its supporting transport mechanisms, the TCP layer 314 and the User Datagram Protocol (UDP) layer 316. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A Virtual Interface (VI) layer 326 implements the VI architecture to provide direct access transport (DAT) capabilities, such as Remote Direct Memory Access (RDMA), as required by the DAFS protocol 318. VI is further described in Virtual Interface Architecture Specification, Version 1.0, by Compaq Computer Corp., Intel Corp. and Microsoft Corp., the contents of which are hereby incorporated by reference.

In addition, the storage operating system includes a disk storage layer 340 that implements a disk storage protocol, such as a RAID protocol, and a disk driver layer 350 that implements a disk access protocol such as, e.g., a SCSI protocol.

Bridging the disk software layers with the integrated network protocol stack layers is a file system 360.

The file system 360 illustratively implements the Write Anywhere File Layout (WAFL) file system having an on-disk format representation that is block-based using, e.g., 4 kilobyte (KB) blocks and using inodes to describe the files. A further description of the structure of the file system, is provided in U.S. Pat. No. 5,819,292, titled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., issued Oct. 6, 1998, which patent is hereby incorporated by reference as though fully set forth herein.

The storage operating system 300 further includes, in the illustrative embodiment, a cluster failover layer 355 that implements various failover features. The cluster failover layer 355 works in conjunction with the cluster interconnect 235 to monitor the status of a cluster partner. Specifically, in various embodiments, the cluster failover layer sends out periodic heartbeat messages to a cluster partner. If the cluster failover layer detects that a cluster partner is not sending heartbeat signals over the cluster interconnect 235, then the cluster failover layer may initiate a failover routine. These failover routines are further described generally in U.S. patent application Ser. No. 09/625,234 entitled NEGOTIATING TAKEOVER IN HIGH AVAILABILITY CLUSTER, by Samuel M. Cramer et al., issued as U.S. Pat. No. 6,728,897 on Apr. 27, 2004, the contents of which are hereby incorporated by reference. However, in accordance with the present invention, the cluster failover layer 355 may determine that a cluster partner is progressing satisfactorily towards booting and that, therefore, a failover procedure is not required. This determination procedure, described further below, permits a more efficient use of system resources when a cluster partner has suffered a minor error condition, and will not be off line or inaccessible for an extended period of time.

Additionally, the storage operating system 300 includes a layer of firmware 370 that is associated with the higher layers in the storage operating system and the hardware 200. The firmware 370 is initialized upon booting of the storage system. In particular, the system firmware provides a basic initial inputs to the microprocessor so as to boot the computer. This process should be broadly termed "boot mechanism." At power-on or when a storage system reboots due to an error condition, the boot mechanism, stored in the firmware, is responsible for initializing memory, establishing various hardware connections, and performing certain power-on self tests (POSTs). The boot mechanism, if all is functioning properly, then enables initial access to the stored copy of the storage operating system kernel so that it may be loaded into the storage system's memory. When appropriate, the storage operating system comes on-line and takes over storage system operations. The present invention is directed, in part, to a modification of the firmware to create a virtual interface or other RDMA-capable protocol interconnect and may be accessed by a cluster partner. By "remote direct memory access" (RDMA) it is meant generally a form of direct memory access where data is moved directly from a memory location on a first computer to a memory location on a second computer without significant intervention by processes of the central processing unit of either computer.

D. Cluster Partner Boot Status Monitoring

In accordance with an illustrative embodiment of the present invention, a booting cluster storage system generates two virtual interfaces for use in monitoring its status by other computers in the cluster. Under the virtual interface specification, a connection must exist between two virtual interfaces before any virtual interface operation, such as a RDMA operation, may be executed over the VI. A VI connection is opened through process of exchanging some connection information between the two endpoints of the VI connection. For example, when VI is implemented over the Fibre Channel protocol, this connection information consists of two values: a remote VI number and a remote Fibre Channel ID (FCID). A connection is considered established when the FC-VI hardware has initialized the VI connection state and each side with the above two values of the other endpoint of the VI connection. Typically, the exchange of connection information is accomplished by exchanging special Fibre Channel/VI connection protocol messages. In accordance with the illustrative embodiment of the present invention, utilize a predetermined and preassigned set of values, described further below.

Figure 4:
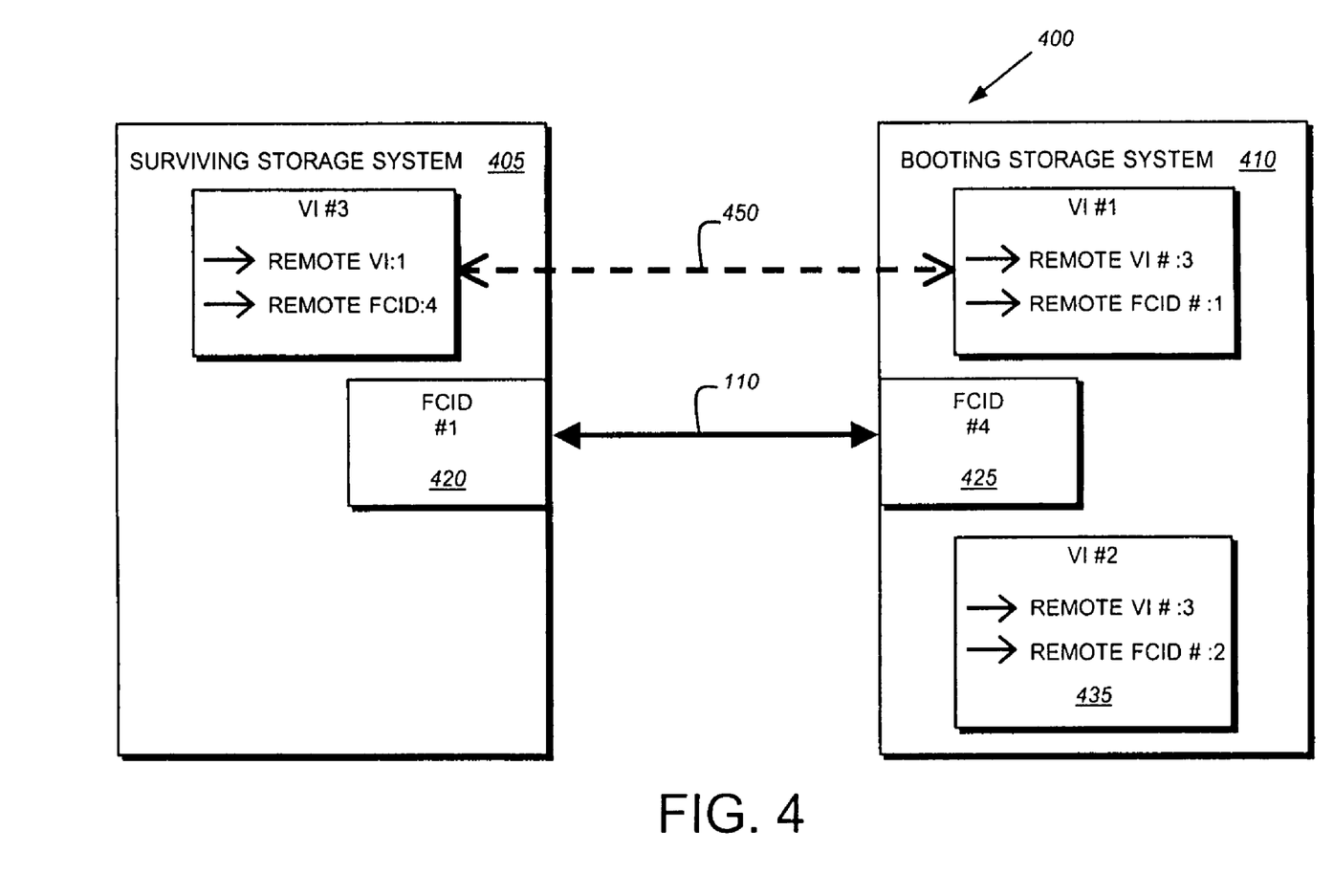
FIG. 4 is a schematic block diagram of an exemplary two-node cluster arrangement in accordance with an embodiment of the present.

An exemplary schematic block diagram of a two-node cluster pair environment 400 is shown in FIG. 4. It should be noted that the teachings of the present invention may be implemented in clusters having any number of nodes. Two nodes are shown for illustrative purposes only. The exemplary cluster environment 400 includes a surviving storage system 405 and a booting storage system 410. The surviving storage system 405 is a node of the cluster that has remained on-line and active, while the booting storage system 410 has suffered an error condition and has begun a reinitialization or rebooting procedure. The two storage systems 405 and 410 are linked by a cluster interconnect 110. The cluster interconnect 110, in the illustrative embodiment, is a Fibre Channel connection between the two storage systems 405 and 410. In alternate embodiments, the cluster interconnect may be another form of transport media, including, for example, the InfiniBand Trade Association's InfiniBand®. In this illustrative embodiment, the two storage systems are utilizing Virtual Interface connections implemented over Fibre Channel (FC-VI). FC-VI is further described in Fibre Channel Virtual Interface (FC-VI), Rev. 1.6, dated Jul. 5, 2000 by the T11 Committee of the American National Standards Institute, Inc., the contents of which are hereby incorporated by reference.

During normal operation, both of the storage systems will use a soft assignment of a Fibre Channel ID (FCID), which commonly default to values of 1 and 2. When one of the storage systems reboots, the booting storage system's boot firmware hard assigns a FCID of 4 to its FC-VI adapter. The booting storage system also generates two Virtual Interfaces, namely VI 1 and 2. The booting storage system then sets the connection state of each VI to a preset and predetermined value. For VI number 1, the connection state is that the Remote VI is 3 and the Remote FCID is 1. For VI number 2, the connection state is that the Remote VI value is 3 and the Remote FCID is 2. The surviving storage system creates a VI (VI number 3) and initializes the connection state for this VI. If its local FCID has a value of 1 and the Remote FCID has a value of 4, then the VI is initialized with a Remote VI value of 1 and a Remote FCID value of 4. If its local FCID is 2 and the Remote FCID is 4, then the VI is initialized with a Remote VI value of 2 and a Remote FCID value of 4. Otherwise, the surviving storage system will attempt to us FC-VI connection messages to negotiate an open VI connection. In the exemplary embodiment shown in FIG. 4, the surviving storage system 405 has originated a connection 450 between its virtual interface 440 and the virtual interface 430 generated on the booting storage system.

Figure 5:
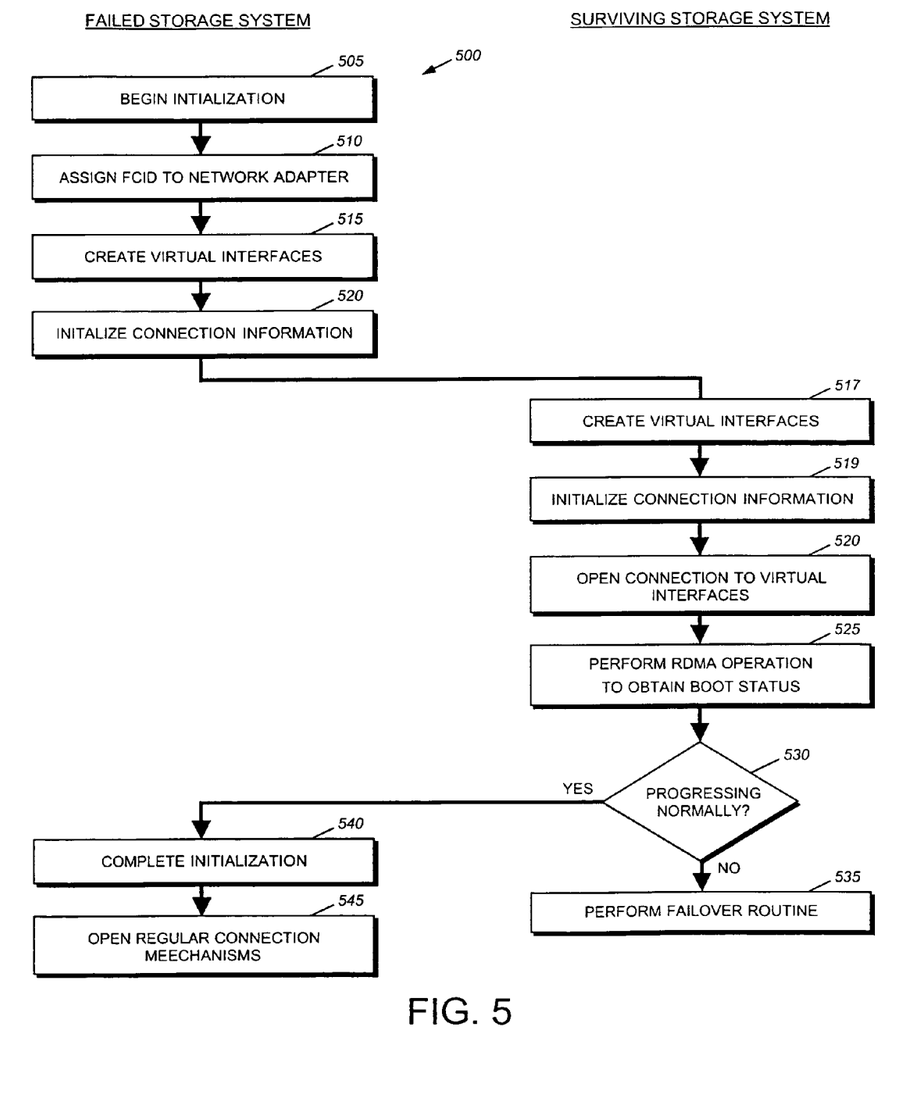
FIG. 5 is a flow chart detailing the steps of a procedure for monitoring a cluster partner boot status over a RDMA-capable transport protocol in accordance with an embodiment of a present invention.

A flow chart detailing the steps of a procedure 500 for monitoring the boot-time status of a cluster partner is shown in FIG. 5. First, in step 505, the failed storage system begins an initialization process. This initialization process comprises the execution of boot-time code from the firmware layer of the storage operating system. The initialization procedure may be initiated by a reboot of the storage system occasioned by, for example, a temporary loss of power or a software command executed due to the detection of an error. Next, in step 510, the failed (and now booting) storage system assigns a FCID to its network adapter. In the illustrative embodiment, this FCID is a predetermined and preset number, for example "4." By assigning a preset and predefined number, the surviving storage system knows the value of the FCID to connect to for RDMA operations. The failed storage system then creates one or more virtual interfaces (step 515). Then, in step 516, the VI connections are initialized with the appropriate connection information. These virtual interfaces are initialized so that they have a pre-assigned virtual interface number and are associated with pre-assigned FCID. This assignment of a FCID to the booting storage system is a hard assignment. By "hard assignment" it is meant generally that the firmware code will always assign a given predetermined and preassigned FCID to a booting storage system. This hard assignment is in contrast to the soft assignment that the surviving storage system performs. By "soft assignment" it is meant generally that the surviving storage system will assign a FCID selected from a set of possible FCEDs, but that each time a FCID is assigned it does not need to be the same FCID. Thus, any computer utilizing the appropriate VI and Fibre Channel numbers may issue VI commands via the virtual interface. This obviates the need for higher level functionality to open virtual interface connections between the two systems.

Similarly, in step 517, the surviving storage system creates a virtual interface. This VI is then initialized, in step 519, with the appropriate VI connection information. The surviving storage system opens a connection to one of the virtual interfaces in step 520. This connection is established when the surviving storage system issues the appropriate commands to the FC-VI hardware to associate the connection information (Remote FCID number and Remote VI number) with that particular VI number. Once the connection is established, the surviving storage system may then perform RDMA-READ operations (step 525) to obtain the boot status of the booting storage system. In an illustrative embodiment, the firmware of the booting storage system maps a set of boot variables to a predetermined memory address, for example, memory address 1000. Thus, the surviving storage system may perform a RDMA operation using conventional VI RDMA commands and request a known size of memory that contains boot variables and begins from the predetermined memory location. The specific memory address and data sizes required for monitoring the boot time status of a cluster partner will vary with the type of a storage operating system and the specific hardware utilized. These variables are well known to those skilled in the art. In the example of the Data ONTAP storage operating system, these boot variables may include a boot_stage variable and a boot_progress variable. In the illustrative embodiment, the boot_stage variable may have one of several values. These various boot stage values identify the stage that the booting file or storage system is currently performing. For example, the firmware may be performing its power-on self tests (POSTs), or may be loading the kernel or may be performing a memory test. The boot_progress variable is an integer that is periodically incremented during the booting procedure. Thus, the surviving storage system may periodically check the boot variables, including the boot_ progress variable, to determine that the booting storage system is progressing or making forward progress in its boot cycle. Once the surviving file system has obtained the boot variables, it determines if the booting file server is progressing normally in its booting procedure (step 530). If the booting storage system is not progressing normally, then the surviving storage system will perform a failover routine (step 535). Such failover routines are described generally in the above-identified U.S. patent application Ser. No. 09/625,234.

However, if boot up of the failed storage system is progressing normally, the procedure then branches to step 540, where the failed storage system completes its initialization routines. During the course of the completion of the initialization or booting, the higher-level software layers of the storage operating system are loaded and activated. Once the system exits the firmware mode and enters the full storage operating system mode, the created virtual interfaces are destroyed and the "regular" run time VI connection mechanisms are activated (step 545). By "regular" it is meant VI connection mechanisms associated with the upper level VI layer of the storage operating system. At this point, the booting storage system has completed its initialization state and is active and capable of accepting virtual interface connection requests and serving/servicing data access requests directed to files or vdisks stored on the storage system.

To again summarize, the firmware of a booting storage system of a storage system cluster creates a set of virtual interfaces that utilize pre-assigned and predetermined FC IDs and VIs. This enables a surviving or partner cluster storage system to connect with the booting storage system without the need for the booting storage system to activate higher-level protocol layers of the storage operating system. Once connected via these predetermined and pre-assigned virtual interface connections, the surviving or partner storage system may issue RDMA operations to the booting storage system. These RDMA operations are utilized to obtain a set of boot status variables that identify the progress made by the booting storage system.

The foregoing description has been directed to specific embodiments of this invention. It will be apparent, however, that other variations and modifications may be made to the described embodiments, with the attainment of some or all of their advantages. Specifically, it should be noted that alternate networking protocols, other than VI, may be utilized in accordance with the present invention. Additionally, the procedures or processes may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method for detecting a failed computer, comprising:
   initiating a boot procedure by a first computer, the boot procedure controlled by boot firmware of the first computer;
   establishing a virtual interface by the boot firmware, the virtual interface having boot status data written therein as the first computer proceeds through the boot procedure; and reading the boot status data in the virtual interface by a second computer, the second computer using a remote direct memory access procedure to access data in the virtual interface.

2. The method of claim 1, further comprising:
deciding by the second computer, in response to the boot status data, whether to perform a takeover of the first computer.

3. The method of claim 1, further comprising:
deciding by the second computer, in response to the boot status data, whether to permit the first computer to continue the boot procedure.

4. The method of claim 1, further comprising:
determining by the second computer if the boot procedure of the first computer failed;
performing, in response to determining that the boot procedure of the first computer failed, a failover routine.

5. The method of claim 1, further comprising:
determining by the second computer if the boot procedure of the first computer failed;
allowing, in response to determining that the boot procedure of the first computer succeeded, the first computer to complete its boot procedure.

6. The method of claim 4, further comprising:
opening, in response to the boot procedure succeeding, a connection between the first computer and the second computer using higher level software than the boot firmware.

7. A system to detect a failed computer, comprising:
a first computer, the first computer initiating a boot procedure controlled by boot firmware of the first computer;
a virtual interface established by the boot firmware, the virtual interface having boot status data written therein as the first computer proceeds through the boot procedure; and
a second computer to read the boot status data in the virtual interface by using a remote direct memory access procedure to access data in the virtual interface.

8. The system of claim 7, further comprising:
the second computer to decide, in response to the boot status data, whether to perform a takeover of the first computer.

9. The system of claim 7, further comprising:
the second computer to decide, in response to the boot status data, whether to permit the first computer to continue the boot procedure.

10. The system of claim 7, further comprising:
the second computer to determine if the boot procedure of the first computer failed, and to perform, in response to determining that the boot procedure of the first computer failed, a failover routine.

11. The system of claim 7, further comprising:
determining by the second computer if the boot procedure of the first computer failed;
allowing, in response to determining that the boot procedure of the first computer succeeded, the first computer to complete its boot procedure.

12. The system of claim 7, further comprising:
a connection between the first computer and the second computer opened, in response to the boot procedure succeeding, using higher level software than the boot firmware.

13. A computer readable media, comprising:
said computer readable media containing instructions for execution on a processor for the practice of a method of detecting a failed computer, the method having the steps of,
initiating a boot procedure by a first computer, the boot procedure controlled by boot firmware of the first computer;
establishing a virtual interface by the boot firmware, the virtual interface having boot status data written therein as the first computer proceeds through the boot procedure; and
reading the boot status data in the virtual interface by a second computer, the second computer using a remote direct memory access procedure to access data in the virtual interface.

14. A method for detecting a failed computer, comprising:
initiating a boot procedure by a first computer, the boot procedure controlled by boot firmware of the first computer;
establishing a virtual interface by the boot firmware, the virtual interface having boot status data written therein as the first computer proceeds through the boot procedure;
reading the boot status data in the virtual interface of the first computer by a second computer to ascertain whether the first computer's boot procedure is progressing normally;
in response, if the second computer determines that the first computer's boot procedure is progressing normally, the first computer completes its initialization routine; and
in response, if the second computer determines that the first computer's boot procedure is not progressing normally, the second computer will perform a failover routine.

15. A method for detecting a failed computer, comprising:
assigning a first virtual interface (VI) for failure recovery to the first computer and a second VI for failure recovery to the second computer;
establishing during booting by the first computer, after a failure by the first computer, a VI for connection to the second VI of the second computer; and
reading status information by the second computer of the first computer through the first VI of the first computer, the second computer using its second VI to communicate with the first VI of the first computer.

16. The method of claim 15, further comprising:
deciding by the second computer, in response to the reading the status information, whether to perform a takeover of the first computer.

17. The method of claim 15, further comprising:
deciding by the second computer, in response to the reading the status information, whether to permit the first computer to continue the boot procedure.

* * * * *